(12) United States Patent
Metzdorf et al.

(10) Patent No.: US 10,399,383 B2
(45) Date of Patent: Sep. 3, 2019

(54) OPERATING CONTROL FOR ACTUATING A BRAKE AND MOVEABLE UNIT

(71) Applicant: Stabilus GmbH, Koblenz (DE)

(72) Inventors: Manfred Metzdorf, Koblenz (DE); Bastian Arntzen, Ochtendung (DE); Jörg Hillen, Nörtershausen (DE); Oleg Batosky, Boppard Oppenhausen (DE)

(73) Assignee: Stabilus GmbH, Koblenz (DE)

( * ) Notice: Subject to any disclaimer, the term of this patent is extended or adjusted under 35 U.S.C. 154(b) by 16 days.

(21) Appl. No.: 15/791,215

(22) Filed: Oct. 23, 2017

(65) Prior Publication Data

US 2018/0111417 A1    Apr. 26, 2018

(30) Foreign Application Priority Data

Oct. 24, 2016  (DE) .......................... 10 2016 220 881
May 15, 2017  (DE) .......................... 10 2017 208 151

(51) Int. Cl.
  *B60B 33/00*  (2006.01)
  *A47C 7/00*  (2006.01)

(52) U.S. Cl.
  CPC .......... *B60B 33/0089* (2013.01); *A47C 7/006* (2013.01)

(58) Field of Classification Search
  CPC ........................... B60B 33/0089; A47C 7/006
  USPC ...................................................... 297/217.1
  See application file for complete search history.

(56) References Cited

U.S. PATENT DOCUMENTS

| 4,434,808 A |   | 3/1984 | Burak |                         |
|-------------|---|--------|-------|-------------------------|
| 4,977,914 A | * | 12/1990 | Smerker | A45B 9/04 135/70 |
| 5,392,800 A | * | 2/1995 | Sergi | A45B 3/00 135/65 |
| 5,640,985 A | * | 6/1997 | Snyder | A45B 3/00 135/65 |
| 5,740,825 A | * | 4/1998 | Brunengo | A61H 3/00 135/67 |
| 6,244,656 B1 | * | 6/2001 | Mueller | B60N 2/4228 297/216.13 |

OTHER PUBLICATIONS

European Search Report for European patent application No. 17197815.8, dated Feb. 13, 2018; 8 pages.

* cited by examiner

*Primary Examiner* — Mark R Wendell
(74) *Attorney, Agent, or Firm* — Rankin, Hill & Clark LLP

(57) ABSTRACT

The invention provides an operating control 28, comprising: a braking body 26 which is adjustable between a braking position, in which the braking body 26 is brought into frictional contact with a braking surface U, and a release position, in which the braking body 26 is pulled back from the braking surface U, a load input portion 22, which is set up to receive a loading force from a user, and a load trigger mechanism 42, 46 which converts a loading force acting on the load input portion 22 into an adjustment movement of the braking body 26 from the release position into the braking position.

20 Claims, 12 Drawing Sheets

OPERATING CONTROL FOR ACTUATING A BRAKE AND MOVEABLE UNIT

Figure 1:
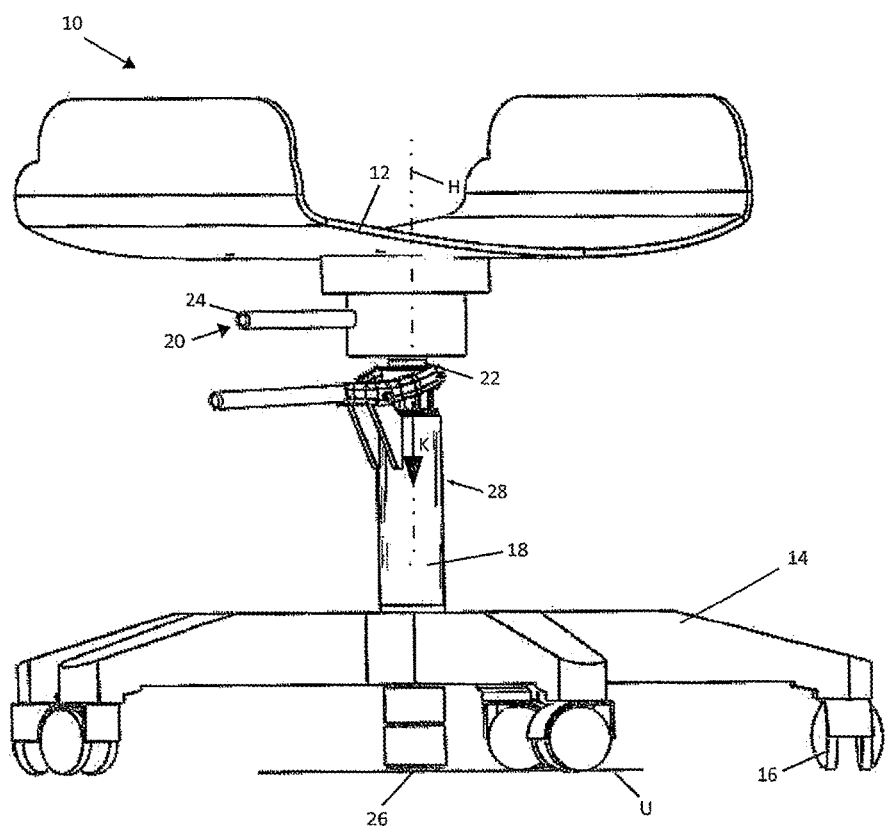

The present invention relates to an operating control, comprising a braking body which is adjustable between a braking position, in which the braking body is brought into frictional contact with a braking surface, and a release position, in which the braking body is pulled back from the braking surface, a load input portion which is set up to receive a loading force from a user, and a load trigger mechanism which converts a loading force acting on the load input portion into an adjustment movement of the braking body from the release position into the braking position. The invention further relates to a movable unit comprising an operating control of this type, by means of which the movement of the movable unit along a floor can be braked.

Operating controls of the aforementioned type are known in the prior art, for example in the form of foot-actuable brakes on rollable carriages or other pieces of furniture. As a result of a load input portion being loaded by the foot of a user, a brake can be adjusted from the release position into the braking position so as to prevent the unit from rolling away unintendedly. A drawback of braking devices of this type is that the user has to perform a separate, in some cases rather complicated actuation of the brake so as to ensure that the unit is secured against unintended movement. If the user forgets to actuate the brake, unintended results or even accidents cannot be ruled out, for example if a user leans or sits on a piece of furniture which is not sufficiently secured against rolling away. On the other hand, in some situations the rolling or sliding movement of the movable unit is fundamentally desirable. For example, in an office chair provided with rollers, it should be possible for the chair to be movable along a floor in a controlled manner even when the unit is loaded. In this case, there fundamentally ought to be a possibility of unbraked movement of a unit of this type.

Against this background, the object of the present invention is to provide an operating control which, in a movable unit, can brake or block unintended movement of the unit, but which at the same time makes controlled movement of the movable unit possible when desired by the user.

According to the invention, this object is achieved by an operating control, comprising a braking body which is adjustable between a braking position, in which the braking body is brought into frictional contact with a braking surface, and a release position, in which the braking body is pulled back from the braking surface, a load input portion which is set up to receive a loading force from a user, a load trigger mechanism which converts a loading force acting on the load input portion into an adjustment movement of the braking body from the release position into the braking position, and a brake release mechanism which is set up to adjust the braking body from the braking position into the release position while the loading force is acting on the load input portion.

The operating control according to the invention thus, on the one hand, comprises a load trigger mechanism which ensures that when a load is applied by a user the brake arrives in the braking position so as to prevent unintended movement. On the other hand, according to the invention a brake release mechanism is provided which, even during constant action of the loading force, makes possible controlled release of the brake by way of user actuation and thus makes movement of the movable unit possible when desired. If the operating control is installed for example in a rollable piece of furniture, for example an office chair, a vertically acting loading force from the user can be converted into movement of the braking body into the braking position, in such a way that the brake automatically comes into effect as soon as the user loads the piece of furniture downwards, for example sitting on the chair or leaning against it diagonally downwards. The brake is accordingly activated automatically and prevents the piece of furniture from rolling away unintendedly when this loading force is acting. If the user subsequently sits or leans on the piece of furniture, and subsequently decides to allow rolling movement of the piece of furniture, the brake release mechanism according to the invention makes it possible to adjust the braking body into the release position in such a way that the desired movement along the floor can take place.

In a preferred embodiment of the invention, the operating control further comprises a retraction mechanism, which returns the load trigger mechanism into an initial state if the loading force is removed, in such a way that the load trigger mechanism in this case converts a loading force newly acting on the load input portion into an adjustment movement of the braking body from the release position into the braking position. This variant represents a further safety measure. As a result of the retraction mechanism, it can be ensured that, even after the brake release mechanism is actuated and the braking body is adjusted into the release position, the load trigger mechanism reliably moves the braking body back into the braking position after the load is removed and the load is newly applied. For example, if while the load is being applied, for example when the user is sitting on the piece of furniture, the user has decided to release the brake using the brake release mechanism and to perform a controlled rolling or sliding movement along the floor, and if the user subsequently leaves the piece of furniture in such a way that the loading force is taken away, the retraction mechanism reliably and automatically returns the operating control into an initial state, in such a way that when the load is newly applied, for example if the user or another user newly sits on or leans against the piece of furniture, the load trigger mechanism always automatically sets the braking body into the braking position so as to secure the movable unit against unintendedly rolling or sliding away.

Preferably, the load receiving portion and the load trigger mechanism are set up to receive a loading force acting substantially vertically downwards. The braking operation can in this case be activated in particular at least in part by the force of the weight of a user. The braking body may also move downwards when moved from the release position into the braking position so as to make a simple construction and reliable operation possible. In particular, a loading force acting downwards from the weight of the user can in this case be converted into a braking force in a simple manner.

In a preferred embodiment, the load trigger mechanism comprises a first control element, which can be moved along a control axis, for example vertically downwards, by the action of the loading force. In this way, the loading force can be used directly as a control force for moving the control element. Thus, the first control element may be biased by a first resilient means in a direction counter to the loading force, in such a way that removal of the loading force can automatically be converted into a correspondingly opposing movement of the control element and a corresponding return of the operating control is made possible.

Preferably, the control element transmits the loading force to a brake control element so as to bring about the actual braking movement of the braking body. In this case, the braking body may be formed on the brake control element (or even form the brake control element itself) or the braking body may be moved by the brake control element. As a result of the first control element and the brake control element being provided as separate components, it is possible to establish a corresponding force transmission from the load receiving portion to the braking body for the braking process, and by contrast, for releasing the brake in spite of persistent appliance of the loading force, to interrupt this force transmission in part or in whole.

The brake release mechanism may in particular be set up to adjust the brake control element in the movement thereof from the braking position into the release position in such a way that a distance between the braking body and the first control element becomes smaller. Thus, when the first control element has been moved from an unloaded into a loaded position by the user by applying the loading force, causing the braking body to move from the release position into the braking position, the brake release mechanism makes it possible to adjust the braking body from the braking position into the release position, even though the first control element remains in the loaded position. In other words, the braking body moves towards the first control element in the force transmission chain.

To promote the adjustment of the braking body into the release position, a second resilient means may be provided which biases the braking body towards the first control element. This may be useful in particular if the braking body is located vertically below the first control element, in such a way that the second resilient means can be selected to overcome the force of the weight of the braking body or brake control element.

To adjust the braking body into the release position, and in particular to establish and interrupt force transmission between the first control element and the brake control element, the brake release mechanism may bring about relative rotation between the brake control element and the first control element, in particular relative rotation about the control axis. A brake release mechanism of this type may in particular be of a particularly compact construction.

In a further embodiment of the invention, the brake release mechanism may further comprise: an actuation portion for manual actuation by a user, a second control element movable along the control axis by the actuation portion, and a control portion which converts the displacement movement of the second control element into a rotational movement of the first control element. This embodiment is advantageous in particular if said rotational movement of the first control element changes a coupling between the first control element and the brake control element, for example changing it between a state for transmitting a movement force from the first control element to the brake control element towards the braking position and a state for eliminating this force transmission, in such a way that it is possible for the brake control element to approach the first control element.

A further embodiment of the invention provides that the operating control further comprises a foot portion, relative to which the load input portion is mounted rotatably, and that the brake release mechanism comprises an actuation portion for manual actuation by a user, the actuation portion being rotatable together with the load input portion relative to the foot portion. In this way, it is possible for a person sitting or supporting himself on the load input portion always to find the actuation portion in the same position, independent of a current rotational position of the load input portion relative to a foot portion and optionally also independent of a vertical adjustment of the load input portion. If for example a seat of an office chair is provided on the load input portion, the actuation portion rotates and rises/falls together with the seat and the load input portion, and is always located in the same position relative to a person sitting thereon, in such a way that it can be actuated reliably.

For simple operation, the actuation portion may be a lever, the lever pivot point of which can in this case be rotatable together with the load input portion relative to the foot portion. The lever axis of rotation can extend parallel to the axis of rotation of the load input portion relative to the foot portion. Alternatively, the actuation portion may have a cable pull mechanism comprising a pull cable guided in a cable guide, in which case the cable guide may be rotatable together with the load input portion relative to the foot portion. A cable pull mechanism makes possible increased freedom of construction as regards the selection of the movement path of the actuation portion. As a further alternative, electromechanical actuation by way of a sensing device or the like as an actuation portion is conceivable.

The load input portion may be rotatable about a control axis relative to the foot portion, and the operating control may in this case have a control element which is rotatable about this control axis so as to adjust the braking body from the braking position into the release position when the actuation element is actuated by a user. The selection of the same axis for the rotational movements of the load input portion, the foot portion and the control element can simplify the construction of the operating control.

In a further preferred embodiment of the invention, the operating control may further comprise a length adjustment mechanism, the length adjustment mechanism having a first part and a second part which for the purpose of length adjustment are selectively movable or lockable relative to one another, the first part receiving the loading force of the load input portion and the second part when locked passing the loading force onwards towards the braking body. In this way, the position of the load input portion can be set and for example the height of a seat of a chair can be set. The length adjustment mechanism can in particular operate independently of the load trigger mechanism or the brake release mechanism. The above-described operations of the automatic braking operation and the brake release mechanism are thus independent of a currently set position of the length adjustment mechanism. In the example case of a rollable chair, the braking operation is thus independent of the set seat height of the chair.

Preferably, in the embodiment just described the actuation element is fixed to the first part or is held rotationally engaged relative thereto, in such a way that it is entrained in movement when the first part moves and is thus movable together with the load input portion. In this case, a person sitting or supporting himself on the load input portion can always find the actuation portion in the same position independent of a current position of the load input portion relative to a foot portion.

The length adjustment mechanism may comprise a pneumatic or hydraulic piston/cylinder unit, in particular a lockable pneumatic spring.

A further aspect of the present invention provides a movable unit which has at least one ground contact means on which the movable unit is supported rolling or sliding on a floor, in such a way that the movable unit is movable along the floor, the movable unit having a braking device according to the invention of the type described above, which is set up to brake the movement of the movable unit with respect to the floor. By way of a movable unit of this type, the above-described effects and advantages in relation to controlling the movement of the movable unit along the floor are achieved. It should be noted that braking within the meaning of the present disclosure includes both slowing the movement and completely stopping the movable unit.

In a preferred embodiment of the invention, the movable unit is a chair travelling on rollers, in particular an office chair, which comprises a seat portion for receiving loading force and a foot portion provided with at least one roller as a ground contact means, the load trigger mechanism and preferably further functional elements of the operating control being integrated into a central column of the chair, which provides a bearing connection between the seat portion and the foot portion. In this way, the operating control can be installed on the chair in a visually inconspicuous manner, and by way of the central column effective introduction of the loading force into the load trigger mechanism can be ensured.

In a further preferred embodiment of the invention, the chair may be adjustable between a first configuration as a chair and a second configuration as a standing aid. A standing aid is loaded diagonally downwards when used by the user. This results in a horizontal load component which entails the risk of the standing aid rolling or sliding away when a user leans on it. Unsecured, in other words unbraked, a standing aid of this type can thus lead to accidents. According to the invention, the operating control can be set in such a way that the loading component acting downwards is sufficient for the braking body to be adjusted from the release position into the braking position by the load trigger mechanism automatically. Thus, as soon as the user leans against the standing aid, the piece of furniture is automatically braked and secured against rolling away.

Figure 2:
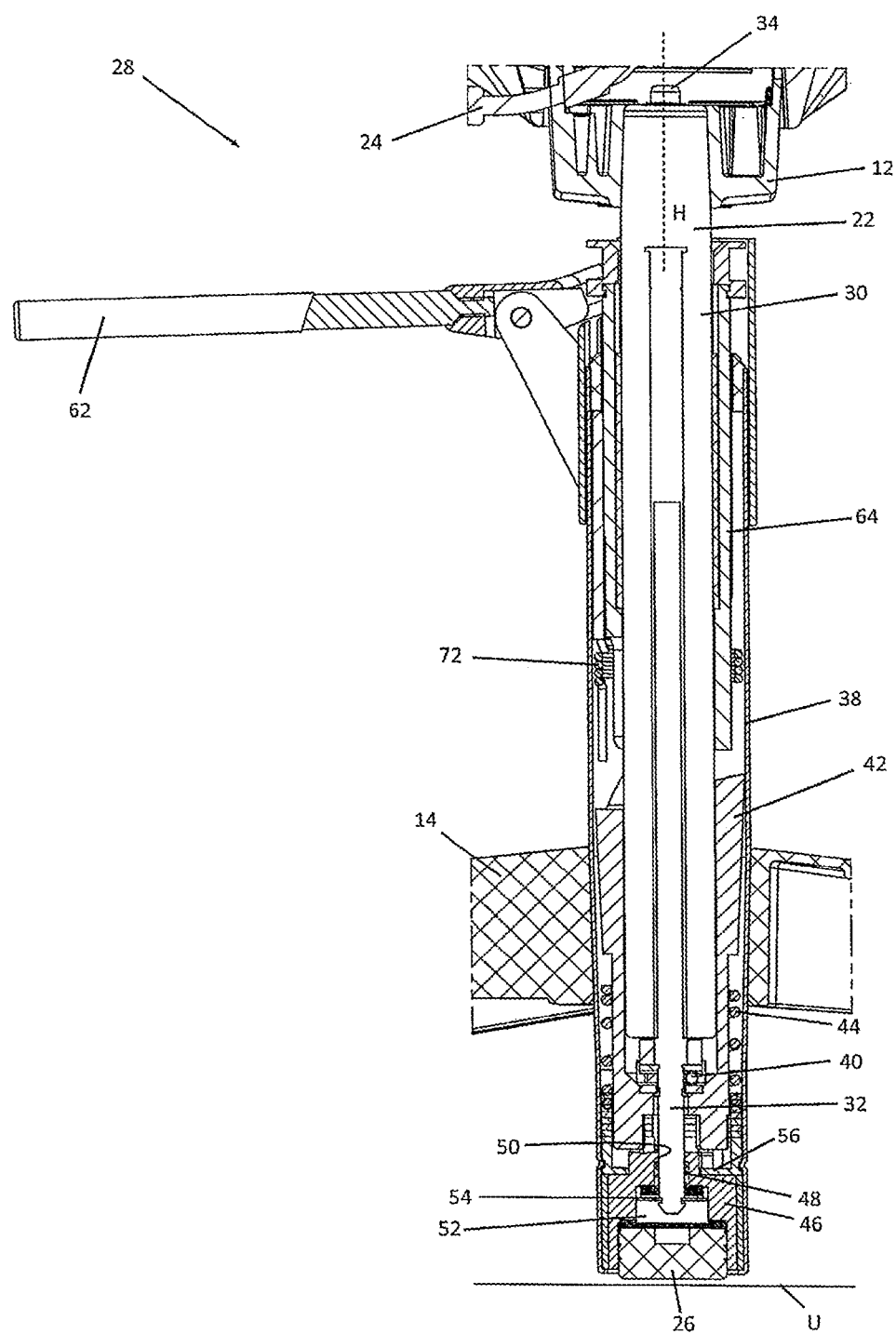
Figure 3:
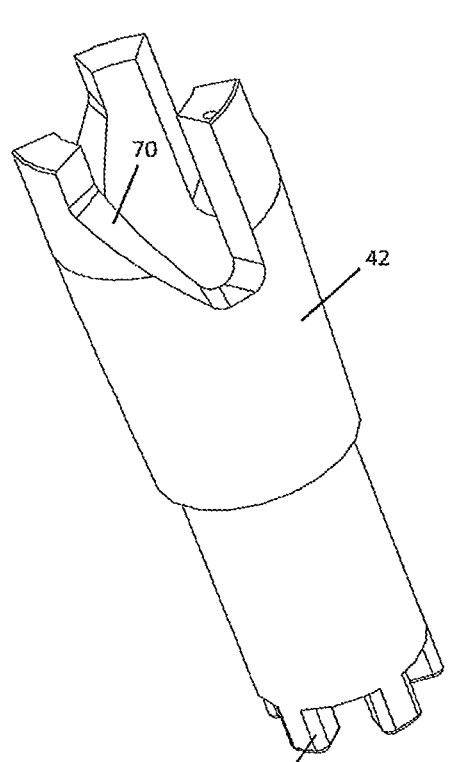
Figure 4:
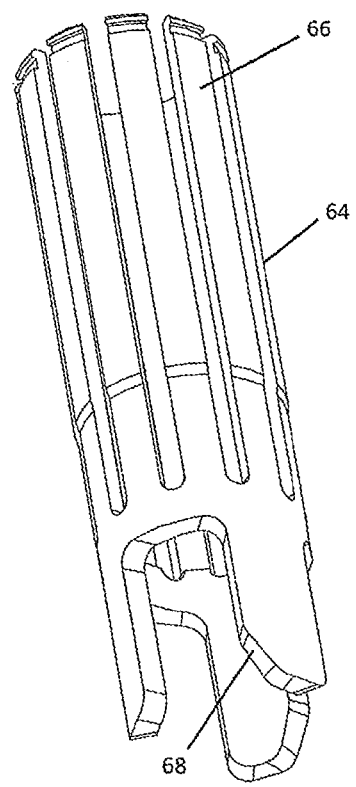
Figure 5:
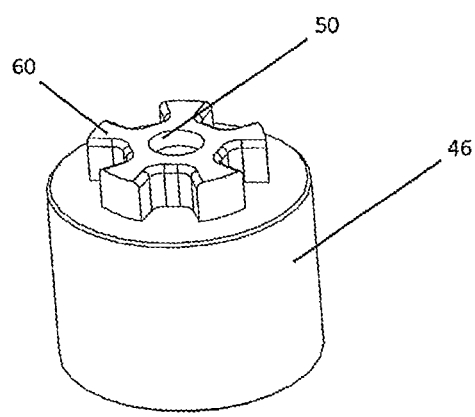
Figure 6:
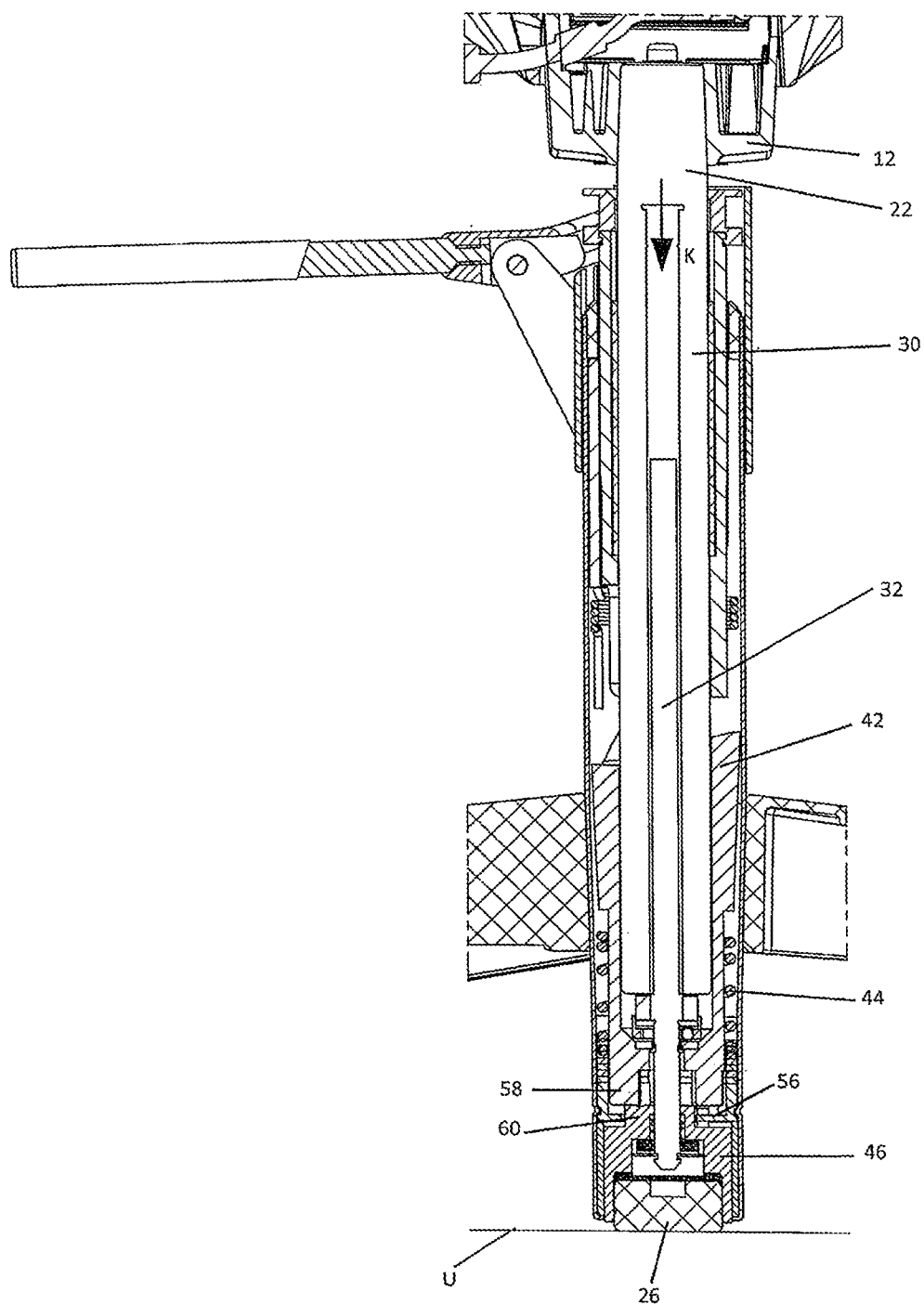
Figure 7:
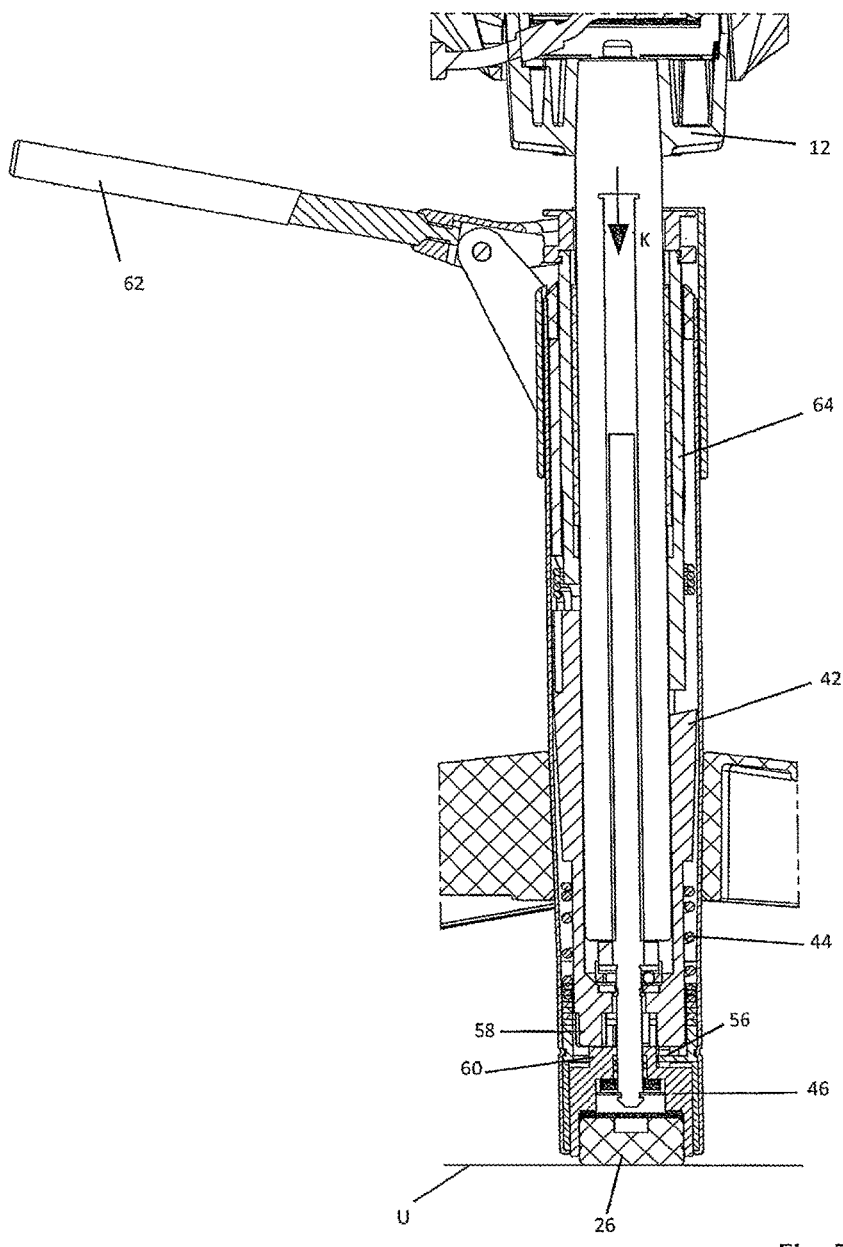
Figure 8:
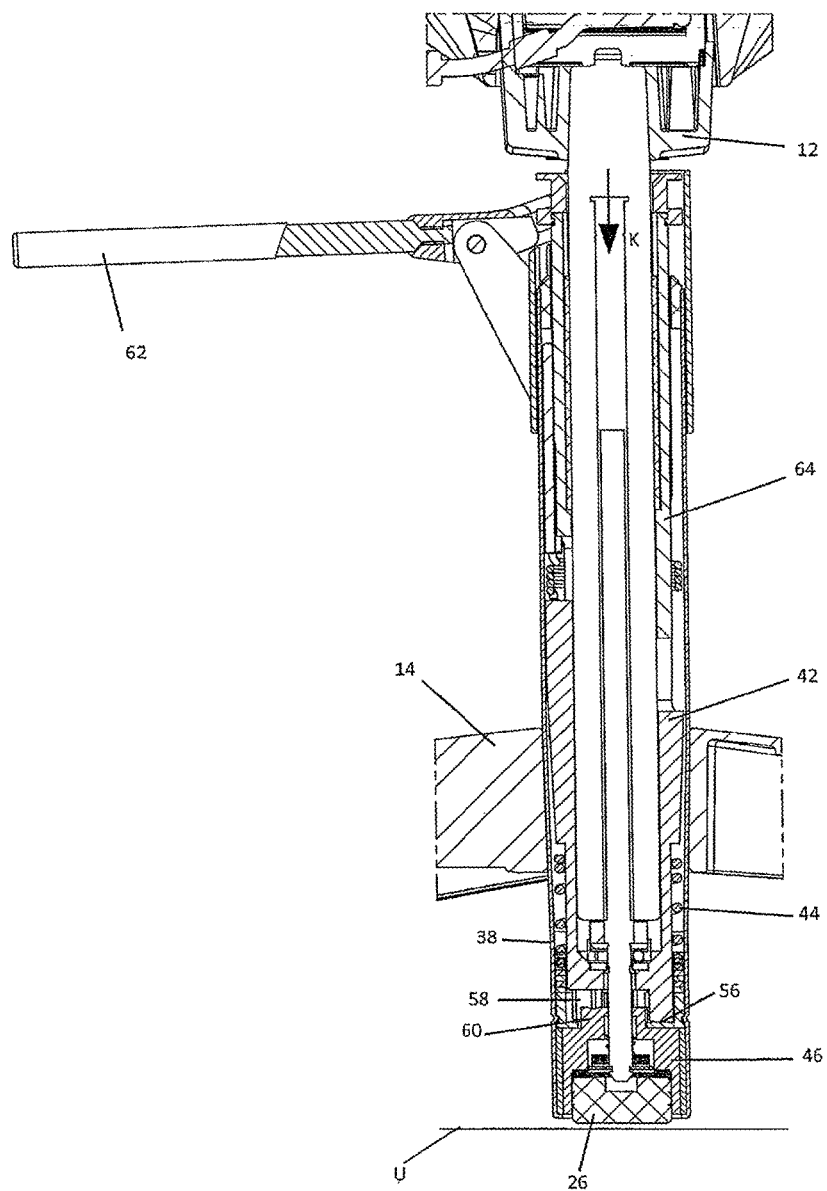
Figure 9:
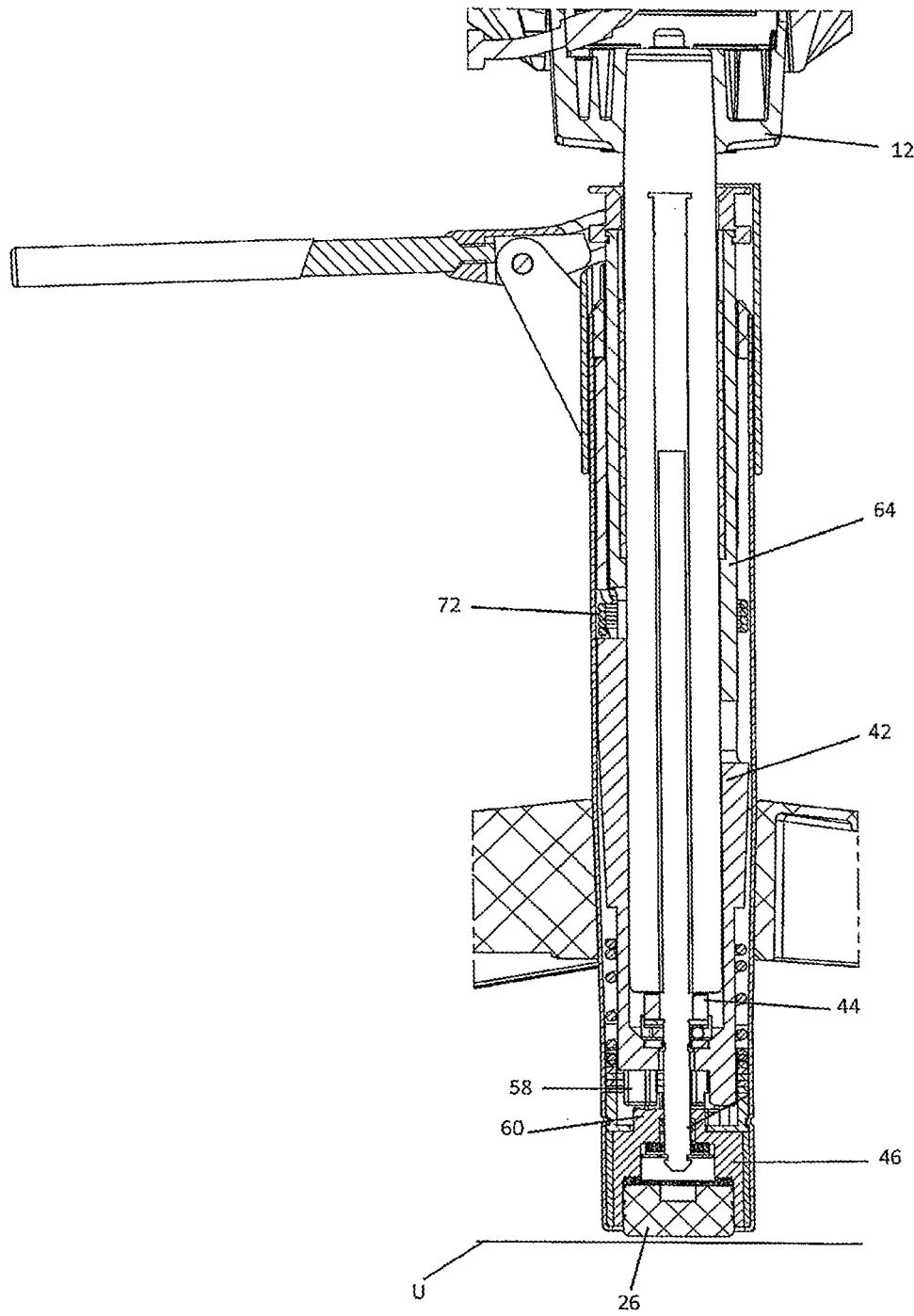
Figure 10:
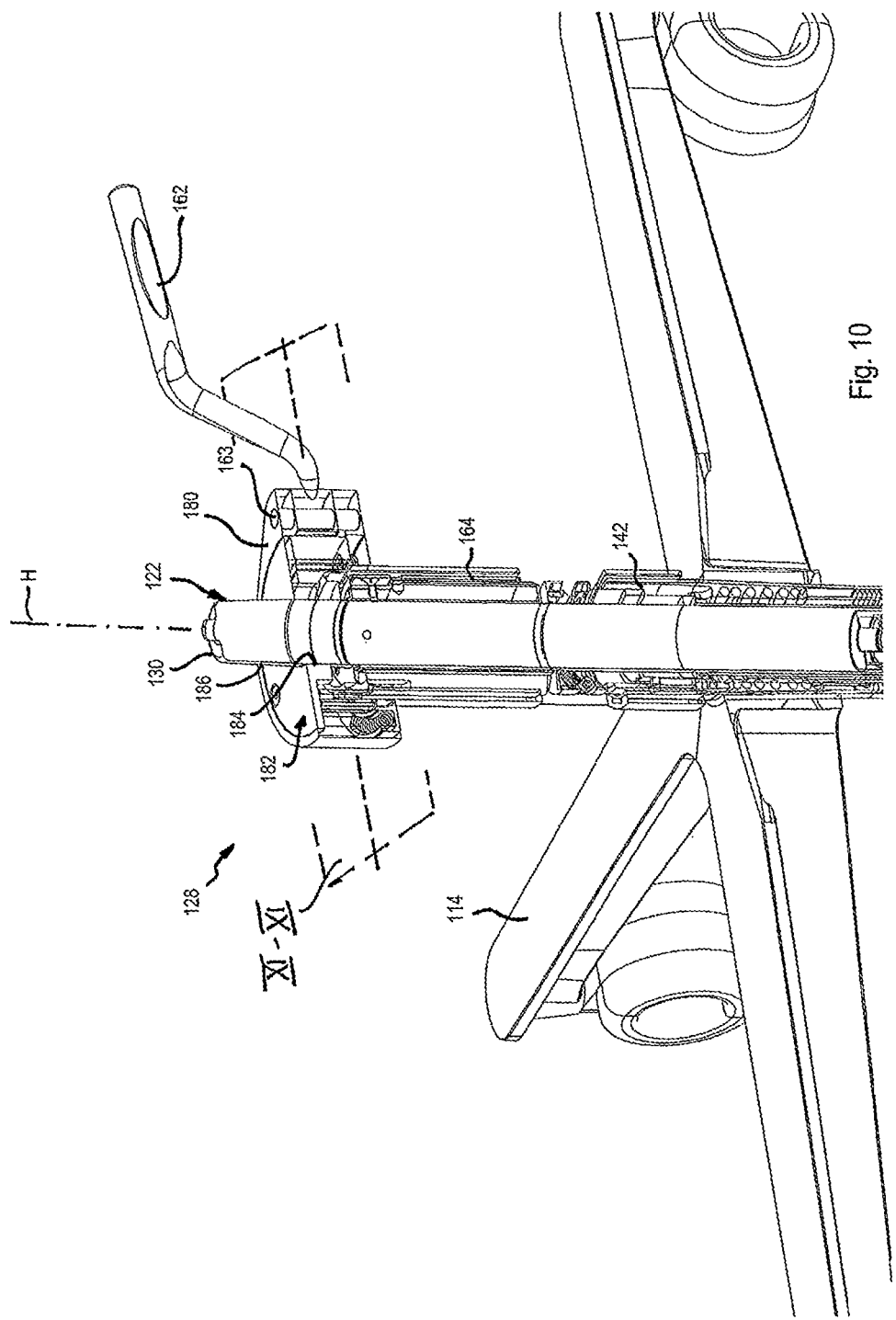
Figure 11:
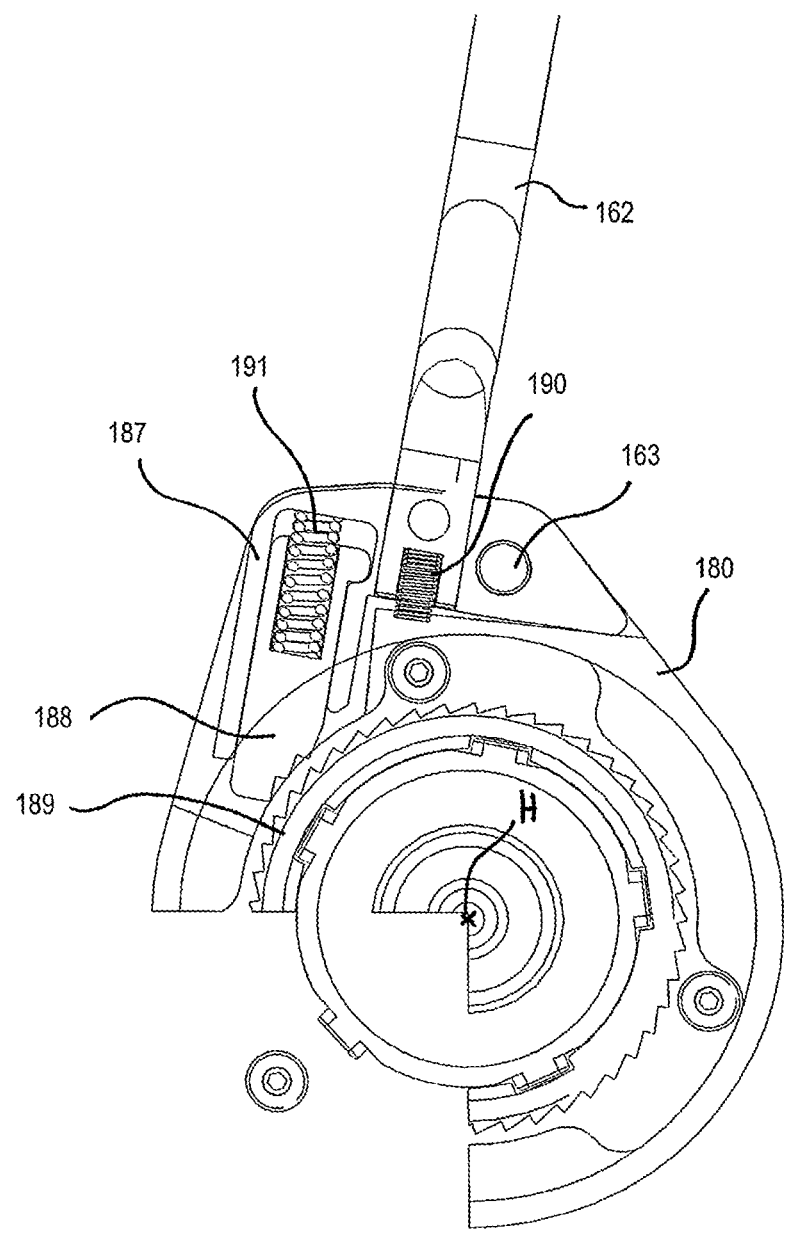
Figure 12:
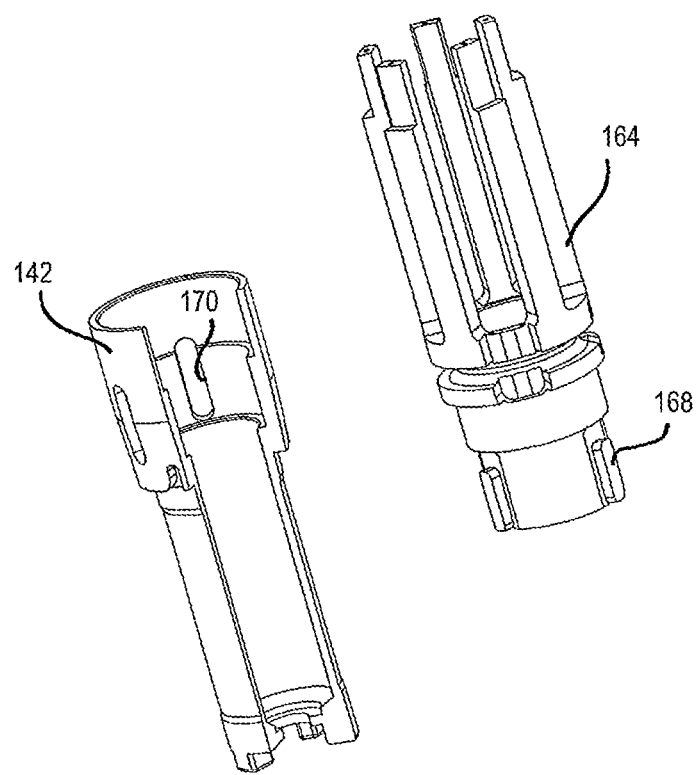
Figure 13:
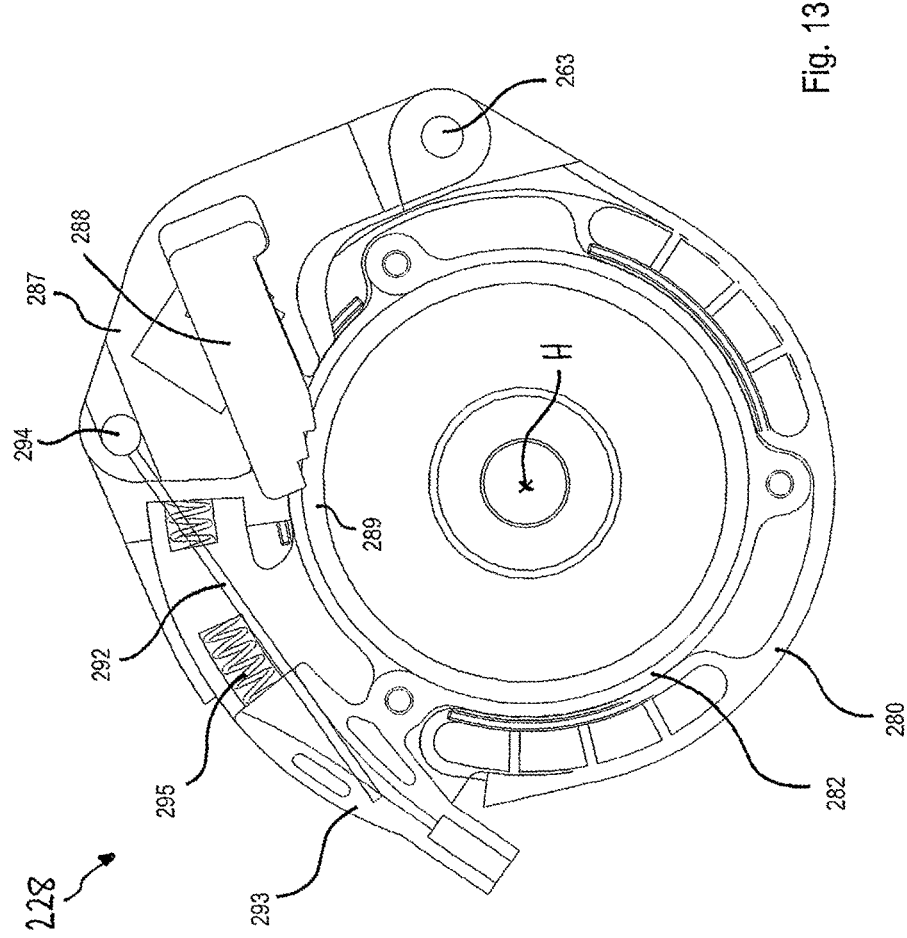
Figure 14:
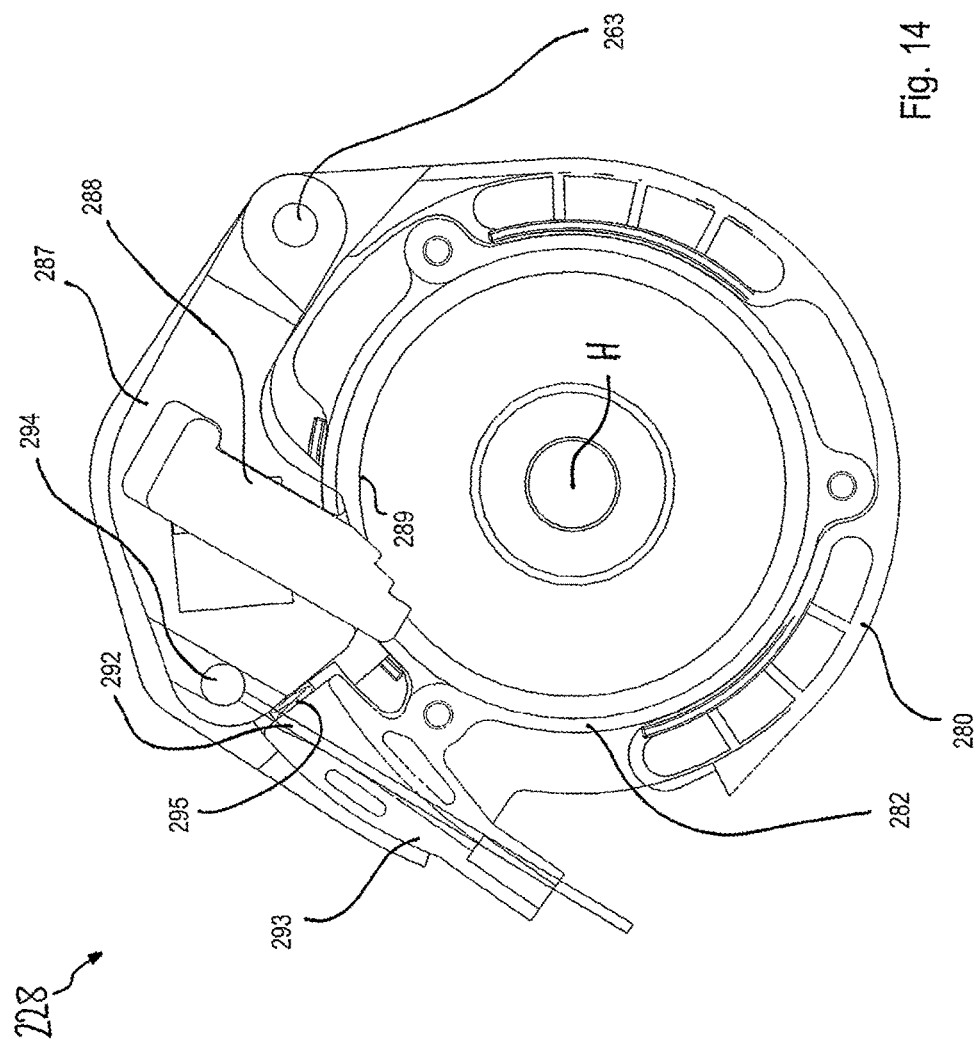

In the following, the present invention is described in greater detail by way of embodiments, referring to the accompanying drawings, in which:

FIG. 1 is a view of a chair as a movable unit in accordance with a first embodiment of the present invention, FIG. 2 is a sectional view of a central chair column of the chair shown in FIG. 1 in an unloaded state of the chair, the section plane containing a central axis of the central column, FIG. 3 is a perspective view of a first control element of the chair in accordance with the first embodiment, FIG. 4 is a perspective view of a second control element of the chair in accordance with the first embodiment, FIG. 5 is a perspective view of a brake control element of the chair in accordance with the first embodiment, FIG. 6 is a view corresponding to FIG. 2, but for a braked state of the chair, FIG. 7 is a view corresponding to FIG. 2, but for an intermediate state during movement from a braking position into the release position, FIG. 8 is a drawing corresponding to FIG. 2, but for a loaded state after the braking body is adjusted into the release position, FIG. 9 is a drawing corresponding to FIG. 2, but for an intermediate state after the loading force is removed and before the initial state according to FIG. 2 is newly achieved, FIG. 10 is a view of a detail of a chair as a movable unit in accordance with a second embodiment of the present invention, FIG. 11 is a sectional view in along a section plane Xi-XI extending orthogonal to the control axis H in FIG. 10, FIG. 12 gives perspective views of a first control element and a second control element in accordance with the second embodiment, FIG. 13 is a sectional view corresponding to FIG. 11, but for a third embodiment of the present invention in an unactuated position, and FIG. 14 is a view corresponding to FIG. 13, but in an actuated position.

A chair as a movable unit in accordance with the embodiment of the invention is denoted as 10 as a whole in FIG. 1, and comprises a seat portion 12 for receiving a force of the weight of a user as a loading force K, a foot portion 14 having a plurality of rollers 16 as a ground contact means for rolling support of the chair 10 on a floor U, and a central column 18 which extends vertically between the seat portion 12 and the foot portion 14. In a manner known per se, the seat portion 12 may be rotatable with respect to the foot portion 14 about the vertical primary axis H of the central column 18 (the central axis of the central column 18). Further, a height adjustment mechanism 20 may be provided for setting the height of the seat portion 12 above the floor U. The height adjustment can take place by way of a pneumatic spring 22 known per se, which extends along the primary axis H and is actuable by way of a first actuation lever 24 in a manner known per se.

According to the invention, the chair 10 further comprises a braking body 26 which is movable between a braking position, in which it contacts the floor U and thus prevents movement of the chair 10 with respect to the floor U by way of a friction effect, in particular preventing the chair 10 from rolling away, and a release position, in which the braking body 26 does not or does not effectively contact the floor U, in other words is retracted sufficiently to be at a predetermined distance from the floor U.

The braking body 26 is part of an operating control 28 which is largely integrated into the central column 18 and controls the adjustment of the braking body 26 between the braking position and the release position. The construction and operation of the operating control 28 are described in the following, referring to FIGS. 2 to 9.

Part of the operating control 28 is the pneumatic spring 22, comprising a first part 20 and a second part 32 which are axially displaceable relative to one another and are lockable in a selected displacement position. They are locked and unlocked in a manner known per se by actuating a trigger element 34, in particular for opening and closing a pneumatic valve of the pneumatic spring 22. The trigger element 34 is preferably, in a manner likewise known per se, actuated by the first actuation lever 24 being moved by the user, so as to set the height of the chair 10.

The first part 30 of the pneumatic spring 22, in this case the cylinder of the pneumatic spring 22, receives the seat portion 12 at the upper end thereof, in such a way that the loading force K acting on the seat portion 12 from above as a result of the force of the weight of the user acts on the first part 30 downwards (see also FIG. 6, which shows the loaded state).

The pneumatic spring 22 is inserted into a cylindrical housing 38 of the central column, the first part 30 preferably being able to rotate about the primary axis H and be displaced along the primary axis H relative to the housing 38. The second part 32 is coupled to a first control element 42 at a bearing 40 in such a way that the second part 32 can rotate about the primary axis H relative to the first actuation element 42, but is held axially undisplaceable on the first control element 42. The first control element 42 in turn is held axially displaceable in the housing 38 and rotatable about the primary axis H. It may be received as a sleeve, in such a way that it also receives the first part 30 of the pneumatic spring 22 in a displaceable and rotatable manner when the pneumatic spring 22 is retracted.

By way of a first spring 44, the first control element 42 can be biased axially upwards. In this case, it can be seen that when a loading force K acts and the pneumatic spring 22 is locked the second part 32 is moved downwards and the first actuation element 42 moves downwards counter to the force of the first spring 44.

To adjust the braking body 26 from the release position into the braking position, the first control element 42 can transmit movement force downwards to a brake control element 46. The braking body 26 is fixed to or formed on the brake control element 46. The brake control element 46 is preferably likewise held axially displaceable in the housing 38 of the central column 18. Preferably a second spring 48 is provided which biases the brake control element 46 axially upwards and thus biases the braking body 26 into the release position.

In the illustrated embodiment, the axial bearing of the brake control element 46 is implemented, by way of example, by introducing a lower end of the second part 32 of the pneumatic spring 22 into a central opening 50 of the brake control element 46. In the interior of the brake control element 46, the opening 50 is widened to form a spring chamber 52, in which the second spring 48 is received. In this case, the second spring 48 is braced on the one hand on an internal wall, adjacent to the rim of the opening 50, of the spring chamber 52 and on the other hand on a spring stop, for example a fixed disc 54, axially fixed to the end of the second part 32. A movement of the brake control element 46 can be limited axially upwards by the brake control element 46 stopping on a stop 56 fixed with respect to the housing.

Depending on a rotational position of the first control element 42 relative to the brake control element 46 about the primary axis H, either the first control element 42 can transmit a movement force to the brake control element 46 towards the braking position or the force transmission is eliminated. An example of a possible implementation of this functionality is described referring to FIGS. 2, 3 and 5. A first toothing 58 can be seen on a lower end, facing the brake control element 46, of the first control element 32, and a second toothing 60 can be seen on an upper end, facing the first control element 42, of the brake control element 46. If the first control element 42 is set to a rotational position such that teeth of the first toothing 58 are opposite teeth of the second toothing 60, in other words the first toothing 58 and the second toothing 60 do not mesh, the first control element 42 can pass the loading force K onwards to the brake control element 46 by way of contact between the axial end faces of the toothings 58, 60, and thus press the braking body 26 onto the floor U. By contrast, if the first control element 42 is in a rotational position such that teeth of the first toothing 58 can mesh in tooth gaps in the second toothing 60, the first control element 42 and the brake control element 46 can continue to approach one another. This means that the first control element 42 can move downwards under the loading force K independent of the position of the brake control element 46 until it stops on a stop fixed with respect to the housing (for example the stop 56 fixed with respect to the housing) and the loading force K is thus introduced into the housing and via the housing into the foot portion 14 and the rollers 16. On the other hand, as a result of the eliminated force transmission between the first control element 42 and the brake control element 46, the brake control element 46 can be moved upwards by the force of the second spring 48, in such a way that the braking body 26 rises off the floor U.

The brake is subsequently in the release position in spite of the persistent application of the loading force K (see also FIG. 8).

Thus, a brake release mechanism is implemented in that the first control element 42 is adjustable by rotation about the primary axis H into a position such that the toothings 58, 60 can mesh in one another and the brake control element 46 is moved upwards to release the brake. The rotation of the first control element 42 can be triggered by the user by actuating a second actuation lever 62, for example using the actuation mechanism described in the following. In the embodiment, an operating actuation of the actuation lever 62 is converted into an axial displacement of a second control element 64, which extends around the primary axis H in the form of a sleeve and is arranged above the first control element 42. Actuating the actuation lever 62 thus displaces the second control element 64 axially towards the first control element 42. As a result of a longitudinal toothing (not shown) fixed with respect to the housing meshing in a corresponding longitudinal toothing 66 of the second control element 64, the axially displaceable but non-rotatable guide can be implemented using simple means.

The axial downward movement of the second control element 64 is converted into a compulsory rotational movement of the first control element 42. This movement conversion takes place in that a first control cam 68 on the lower end of the second control element 64 engages in a second control cam 70 on the upper end of the first control element 42 (cf. FIGS. 3 and 4). The control cams 68, 70, which may for example be formed in the manner of a steep thread, are formed in such a way that they bring about rotation of the first control element 42 through approximately half of the tooth division (angular distance between two adjacent teeth) of the toothings 58 and 60 during the axial movement of the second control element 64 as a result of the actuation of the second actuation lever 62.

After the actuation of the second actuation lever 62 is over and the second actuation lever 62 is released, it returns to the initial position thereof. This can take place by way of the force of the weight of the second actuation lever 62 or optionally with the assistance of a further spring (not shown). The return of the second actuation lever 62 is accompanied by the second control element 64 being pulled back vertically upwards.

Finally, if the loading force K is also taken away, a return mechanism ensures that the operating control 28 arrives back in the initial configuration according to FIG. 2. Thus, the first spring 44, as part of the return mechanism, lifts the first control element 42 back into the upper position thereof. Further, the return mechanism rotates the first control element 42 back about the primary axis H (reverse rotation) into an initial position, in which the toothings 58, 60 do not fit in one another, in such a way that if a loading force K is newly applied this force is transmitted from the first control element 42 to the brake control element 46. Different variants of this reverse rotation of the first control element 42 are conceivable. Thus, as is shown in the specific embodiment, a torsion spring 72 may be provided, which on the one hand acts on the first control element 42 and on the other hand is held rotationally engaged with respect to the housing 38. Alternatively or in addition, the reverse rotation may also be taken on by the first spring 44 if one end of the first spring 44 is held rotationally engaged on the first control element 42 and the other end of the first spring 44 is held rotationally engaged with respect to the housing 38. In this case, an additional torsion spring can be omitted, and the first spring 44 acts both as a compression spring and as a torsion spring. In a further variant, the reverse rotation can be ensured by configuring the control cams 68, 70 on the first and second control elements 42, 64 accordingly, for example in that the control cams are formed in the manner of a steep thread and so as to mesh by fitting in one another so as each to transmit force to the other in both directions of rotation.

In the following, the mode of operation of the chair 10 in accordance with the embodiment is described in greater detail, referring to FIGS. 2 and 6 to 9. FIG. 2 shows the operating control of the chair 10 in an unloaded state, in other words when no loading force K is acting on the seat portion 12. In this case, the first spring 44 holds the first control element 42 in the upper position, and the brake control element 46 is likewise pulled back into the upper position, in such a way that the brake body 26 does not touch the floor U in a manner effective for braking. In this unloaded state, the office chair 10 is thus for example freely displaceable. As soon as a user sits on the office chair 10 or supports himself diagonally downwards thereon, a loading force K acts downwards on the pneumatic spring 22 via the seat portion 12, as is shown in FIG. 6. The pneumatic spring 22, which is normally held in the locked state (first actuation lever 36 unactuated; first part 30 and second part 32 held unmovable with respect to one another), subsequently passes the loading force K via the bearing 40 into the first control element 42, in such a way that the first control element 42 moves downwards. In this position, the teeth of the first toothing 58 of the first control element 42 are positioned opposite the teeth of the second toothing 60 of the brake control element 46 and form a force-transmitting contact, in such a way that the first control element 42 presses the brake contact element 46 downwards. The loading force K is thus passed through to the braking body 26 and presses it against the floor U (FIG. 6). The stronger the braking force K, the greater the braking force via the braking body 26.

If the user sits on the steel 10 or leans downwards against it, there may be a desire to release the brake so as to permit controlled rolling of the chair 10. For this purpose, the user actuates the second actuation lever 62 briefly upwards, causing the second control element 64 to be slid downwards. By way of the engagement between the first control cam 68 and the second control cam 70, this displacement leads to compulsory rotation of the first control element 42 about the primary axis H until teeth of the first toothing 58 of the first control element 42 are precisely opposite tooth gaps in the second toothing 60 of the brake control element 46. FIG. 7 shows an intermediate position of this movement, in which the first control element 42 is not yet fully rotated. However, once the tooth fit has been achieved, as shown in FIG. 8, the contact between the first control element 42 and the brake control element 46 is eliminated and the first control element 42 can move further downwards, until or in so far as it is not obstructed in further downward movement by stopping on the stop 56 fixed with respect to the housing. The loading force K is subsequently introduced via the stop 56 fixed with respect to the housing into the housing 38 and from said housing into the foot 14 of the chair 10 and the rollers 16. At the same time, the aforementioned tooth fit makes possible an upward movement of the brake control element 46 and thus also of the braking body 26 as a result of the action of the second spring 48, until the braking contact with the floor U is eliminated. The brake is thus released, and the chair 10 can be moved along the floor U by way of a rolling movement 16 (FIG. 8).

If the user subsequently stands up from the chair 10 and/or largely removes the loading force K, the first spring 44 sets the first control element 42 axially into the upper position. An intermediate state of this upward movement is illustrated in FIG. 9. Simultaneously, or in any case in the last part of this upward movement, the return mechanism (for example the torsion spring 72 or the first spring 44) rotates the first control element 42 back into the initial position thereof, in which teeth of the first toothing 58 are opposite teeth of the second toothing 60, in such a way that the configuration shown in FIG. 2 is set again. The chair 10 is thus in the initial position again and is ready to brake, in such a way that if a loading force K is newly applied the braking body 26 is set into the braking position again immediately by the first control element 42.

The invention is not limited to the above-described embodiment. Thus, instead of the pneumatic spring 22, rigid transmission from the seat portion 12 to the first control element 42 can take place, or any other length adjustment mechanism can be used. The mechanism of the first control element 42 for establishing or releasing the force transmission between the first control element 42 and the brake control element 46 is also set out above by way of example, but can also be implemented using different mechanisms. Electronic adjustment both of the coupling between the first control element 42 and the brake control element 46 and of the height adjustment of the chair 10 can also be envisaged.

Further, the braking body 26 need not be braced directly on the floor U, but may instead brake one or more of the rollers 16.

The chair 10 may be configurable in such a way that it can on the one hand be used as a seat, in such a way that a user sits on the seat portion 12, and can on the other hand be used as a standing aid, in such a way that a user can lean against the chair 10 while standing. For this purpose, a leaning portion (not shown), which can support a standing person in the posterior region, may be mounted on the chair. The leaning portion may be adjustable between a sitting configuration, in which a person sitting on the seat portion 12 can lean his back on the leaning portion, and a standing configuration, in which the leaning portion can support a user standing next to the chair 10 in the posterior region. Accordingly, the chair 10 can be adjusted between the sitting and standing configuration without adjusting the seat height of the chair 10.

FIG. 10 shows a control element 128 of a chair as a movable unit in accordance with a second embodiment of the invention. The second embodiment is in many ways identical to the first embodiment, and like or corresponding elements or features are denoted by reference numerals increased by 100. In the following, only the differences from the first embodiment are discussed, and for the other elements and features reference is made to the description of the first embodiment.

In the second embodiment, an actuation lever 162, provided for actuating a brake release mechanism and in particular for releasing a braking element of the type described for the first embodiment, is not held on a housing which is fixed with respect to a foot portion 114, but instead is rotatable with respect to the foot portion 114. For this purpose, the actuation lever 162 is held pivotable on a lever axis 163 on a switching ring 180, which is mounted rotatable about a primary axis H of the control element 128 on an actuation housing 182. The lever axis 163 and the primary axis H extend mutually parallel at a distance. The actuation housing 182 in turn may be connected rotationally engaged to a first part 130 of a pneumatic spring 122; in particular, an inner face 184 of the actuation lever housing 182 may be fixed to an outer face 186 of the first part 130 of the pneumatic spring 122 via a press fit.

As can additionally be seen in FIG. 11, during the pivoting movement thereof about the lever axis 163 the actuation lever 162 moves a claw body 187, provided on the actuation lever 162 and having a toothed claw 188, into or out of a latch engagement with an outer toothing of a switching sleeve 189. If the claw 188 and the switching sleeve 189 are in the latched engagement, onward movement of the actuation lever 162 anticlockwise in FIG. 11 subsequently leads to a shared rotational movement of the actuation lever 162, the switching ring 180 and the switching sleeve 189 about the primary axis H. A first spring 190 can bias the actuation lever, in terms of the pivot movement thereof about the lever axis 163, towards releasing the latch engagement between the claw 188 and the switching sleeve 189, in such a way that a user removing the actuation force pivots the actuation lever 162 about the lever axis 163.

The claw 188 may be arranged rigidly on the claw body 187 or alternatively, as is shown in FIG. 11, be coupled to the claw body 187 via an overload means. The overload means is implemented in that the claw 188 is mounted movable with limited play on the claw body 187 and biased towards the switching sleeve 189 by a second spring 191. The play is large enough to disengage the toothings of the claw 188 and the switching sleeve 189 counter to the force of the second spring 191 if, in a state where the actuation lever 162 has been pivoted anti-clockwise in FIG. 11 and the latch engagement between the claw 188 and the switching sleeve 189 has been established, an unusually high force exceeding a predetermined overload force is acting between the switching sleeve 189 and the actuation lever 162 (for example if the user crashes the actuation lever 162 into an obstacle). In this way, damage to the toothings or other parts of the brake release mechanism can be prevented.

The rotational movement of the switching sleeve 189 is converted into a rotational movement of a first control element 142, which as part of the braking release mechanism is responsible for releasing a brake by lifting a brake control element, in a manner corresponding to that described above for the first embodiment. In the second embodiment, a second control element 164 is provided, which is arranged coaxial with the first control element 142 and is coupled to the first control element 142 in a rotationally engaged but axially displaceable manner, for example by engagement of an axial rib 168 of the second control element 164 in an axial longitudinal opening 170 of the first control element 142. The second control element 164 is in turn rotationally engaged with the switching sleeve 189 or formed integrally therewith.

The mode of operation of the control element 128 basically differs from that of the first embodiment by way of the above-described arrangement and operation of the actuation lever 162, in particular in that the actuation lever 162, in the initial position thereof (without actuation), remains stationary relative to the seat portion (load input portion), in other words is entrained in rotation when the seat portion rotates, and also moves vertically together with the seat portion during height adjustment of the seat portion. This is achieved in particular in that the actuation housing 182 which carries the actuation lever 162 is rotationally engaged with the first part 130 of the pneumatic spring 122 to which the seat portion is also to be fixed (although the seat portion is not shown in FIG. 10, on this point reference is made for example to FIGS. 1 and 2 and the seat portion 12, which can be used analogously in the second embodiment too). As is known per se, the first part 130 of the pneumatic spring 122 is guided so as to be longitudinally displaceable and rotatable in a guide sleeve, so as to make adjustment of the seat height and rotation of the seat possible. The actuation lever 162 rotates and is thus lifted together with the seat, and is always accessible to the user in the same position.

FIGS. 13 and 14 show a third embodiment of the invention, which constitutes a variant of the second embodiment. Elements and features identical or corresponding to those of the first or second embodiment are denoted by reference numerals increased by 200 or 100 respectively. In the following, only the differences from the first or second embodiment are discussed, and for the other elements and features reference is made to the descriptions of the first or second embodiment.

In the third embodiment, a Bowden cable arrangement, comprising a pull cable 292 guided in a cable guide 293, takes the place of the actuation lever 162 of the second embodiment. The cable guide 293 is rigidly provided on an actuation housing 282, which in turn can be formed in the manner described above for the second embodiment and fixed to a first part of a pneumatic spring, in such a way that it can rotate together with a seat portion. An end body 294 of the pull cable 292 is hooked into a claw body 287, which corresponds in the rest of its configuration and operation to the claw body 187 of the second embodiment, in particular being pivotable about a lever axis 263 provided in a switching ring 280. The switching ring 280 is again mounted rotatable about a control axis H on the actuation housing 282 in the manner described in the second embodiment.

A claw 288, which is attached to the claw body 287, preferably coupled to the claw body 287 via an overload means of the type described in the second embodiment, engages in a latch toothing (not shown in FIGS. 13 and 14) of a switching sleeve 289, so as finally to entrain this in a continued pulling movement of the Bowden cable. In the actuated position shown in FIG. 14, the pull cable 292 subsequently pulls the claw body 287 onwards and brings about a shared rotational movement of the claw body 287, the claw 288, the switching ring 280 and the switching sleeve 289 about the control axis H to release the brake. After the Bowden cable arrangement is freed, a return spring 295 rotates the switching ring 280 and the claw body back into the initial positions thereof again.

In the third embodiment, the flexibility of the length and extension path of the Bowden cable can be exploited so as to position an actuation element (not shown), via which the Bowden cable arrangement is actuable, in a suitable position of the chair which is easily accessible to the user. For example, the actuation element may be arranged on a seat means.

The operation of the control arrangement of the third embodiment is otherwise identical to that of the first or second embodiment.

The invention claimed is:

1. Operating control, comprising:
    a braking body which is adjustable between a braking position, in which the braking body is brought into frictional contact with a braking surface, and a release position, in which the braking body is pulled back from the braking surface,
    a load input portion, which is set up to receive a loading force from a user,
    a load trigger mechanism which converts a loading force acting on the load input portion into an adjustment movement of the braking body from the release position into the braking position, and a brake release mechanism which is set up to adjust the braking body from the braking position into the release position while the loading force is acting on the load input portion.

2. Operating control according to claim 1, further comprising a retraction mechanism, which returns the load trigger mechanism into an initial state if the loading force is removed, in such a way that the load trigger mechanism subsequently converts a loading force newly acting on the load input portion into an adjustment movement of the braking body from the release position into the braking position.

3. Operating control according to claim 1, wherein the braking body moves downwards when moved from the release position into the braking position.

4. Operating control according to claim 1, wherein the load trigger mechanism comprises a first control element, which can be moved along a control axis by the action of the loading force.

5. Operating control according to claim 4, wherein the first control element is biased by a first resilient means in a direction counter to the loading force.

6. Operating control according to claim 4, wherein the first control element transmits the loading force to a brake control element, the braking body being formed on the brake control element or being moved by the brake control element.

7. Operating control according to claim 6, wherein the brake release mechanism is set up to adjust the brake control element in the movement thereof from the braking position into the release position in such a way that a distance between the braking body and the first control element becomes smaller.

8. Operating control according to claim 4, wherein the braking body is biased towards the first control element by a second resilient means.

9. Operating control according to claim 4, wherein the brake release mechanism brings about a relative rotation between the brake control element and the first control element.

10. Operating control according to claim 4, wherein the brake release mechanism further comprises:
an actuation portion for manual actuation by a user,
a second control element movable along the control axis by the actuation portion, and
a control portion which converts the displacement movement of the second control element into a rotational movement of the first control element.

11. Operating control according to claim 1, wherein the operating control further comprises a foot portion, relative to which the load input portion is mounted rotatably, and in that the brake release mechanism comprises an actuation portion for manual actuation by a user, the actuation portion being rotatable together with the load input portion relative to the foot portion.

12. Operating control according to claim 11, wherein the actuation portion is a lever, the lever pivot point of which is rotatable together with the load input portion relative to the foot portion.

13. Operating control according to claim 11, wherein the actuation portion has a cable pull mechanism comprising a pull cable guided in a cable guide, in which case the cable guide may be rotatable together with the load input portion relative to the foot portion.

14. Operating control according to claim 11, wherein the load input portion is rotatable about a control axis relative to the foot portion, the operating control having a control element which is rotatable about this control axis so as to adjust the braking body from the braking position into the release position when an actuation element is actuated by a user.

15. Operating control according to claim 14, wherein the operating control further comprises a length adjustment mechanism, the length adjustment mechanism having a first part and a second part which for the purpose of length adjustment are selectively movable or lockable relative to one another, the first part receiving the loading force of the load input portion or forming the load input portion, and the second part when locked passing the loading force onwards towards the braking body.

16. Operating control according to claim 15, wherein the actuation element is fixed to the first part or is held rotationally engaged relative thereto.

17. Operating control according to claim 15, wherein the length adjustment mechanism is a pneumatic or hydraulic piston/cylinder unit.

18. Movable unit which has at least one ground contact means on which the movable unit is supported rolling or sliding on a floor, in such a way that the movable unit is movable along the floor, the movable unit having a braking device, which is set up to brake the movement of the movable unit with respect to the floor, wherein the braking device includes:
a braking body which is adjustable between a braking position, in which the braking body is brought into frictional contact with a braking surface, and a release position, in which the braking body is pulled back from the braking surface,
a load input portion, which is set up to receive a loading force from a user,
a load trigger mechanism which converts a loading force acting on the load input portion into an adjustment movement of the braking body from the release position into the braking position, and
a brake release mechanism which is set up to adjust the braking body from the braking position into the release position while the loading force is acting on the load input portion.

19. Movable unit according to claim 18, wherein the movable unit is a chair travelling on rollers, which comprises a seat portion for receiving loading force and a foot portion provided with at least one roller as a ground contact means, the load trigger mechanism being integrated into a central column of the chair, which provides a bearing connection between the seat portion and the foot portion.

20. Movable unit according to claim 19, wherein the chair is adjustable between a first configuration as a chair and a second configuration as a standing aid.

* * * * *